Figure 13:
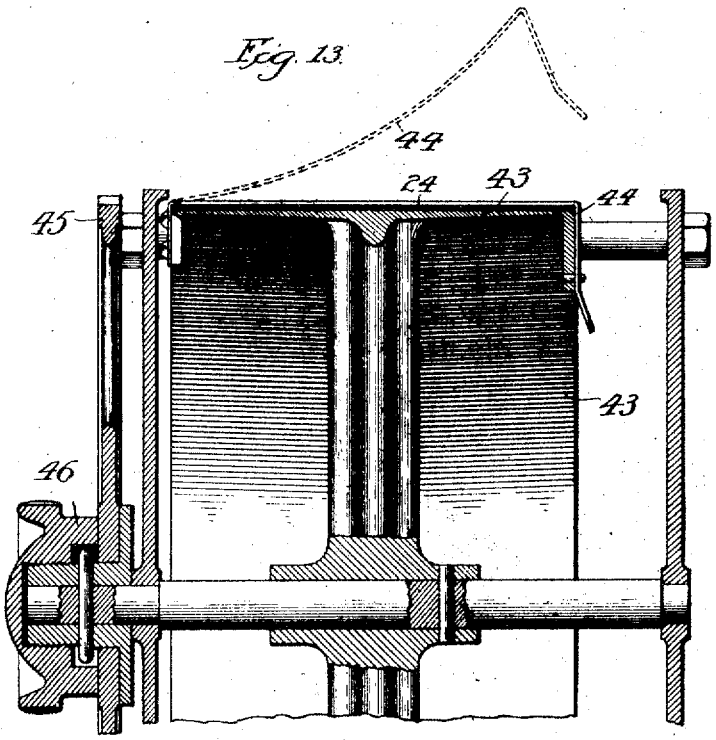

No. 862,478. PATENTED AUG. 6, 1907.
H. B. HOLMES.
WATCH SERVICE RECORDER.
APPLICATION FILED OCT. 20, 1905.
9 SHEETS—SHEET 1.
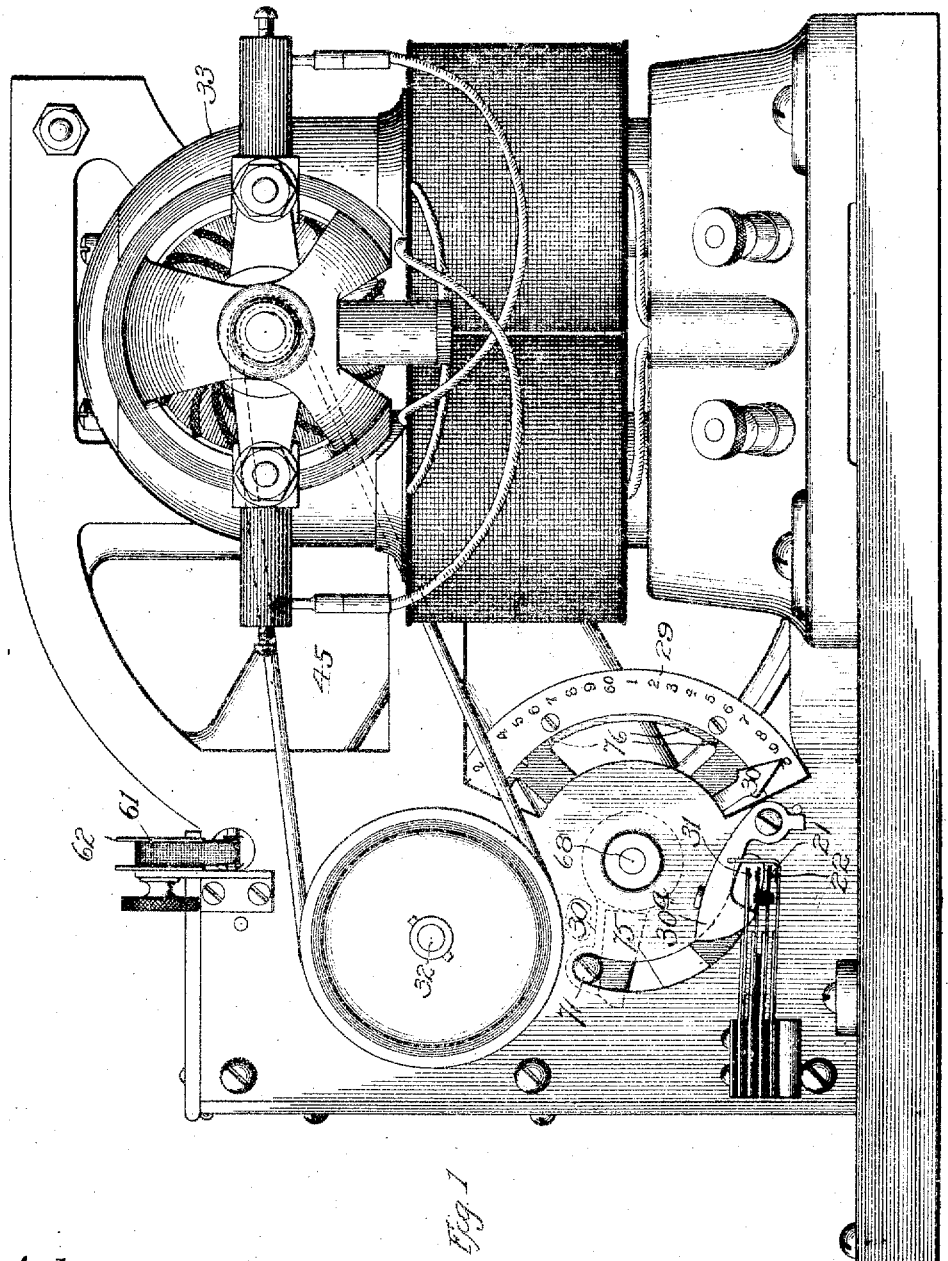

No. 862,478. PATENTED AUG. 6, 1907.
H. B. HOLMES.
WATCH SERVICE RECORDER.
APPLICATION FILED OCT. 20, 1905.
9 SHEETS—SHEET 2.
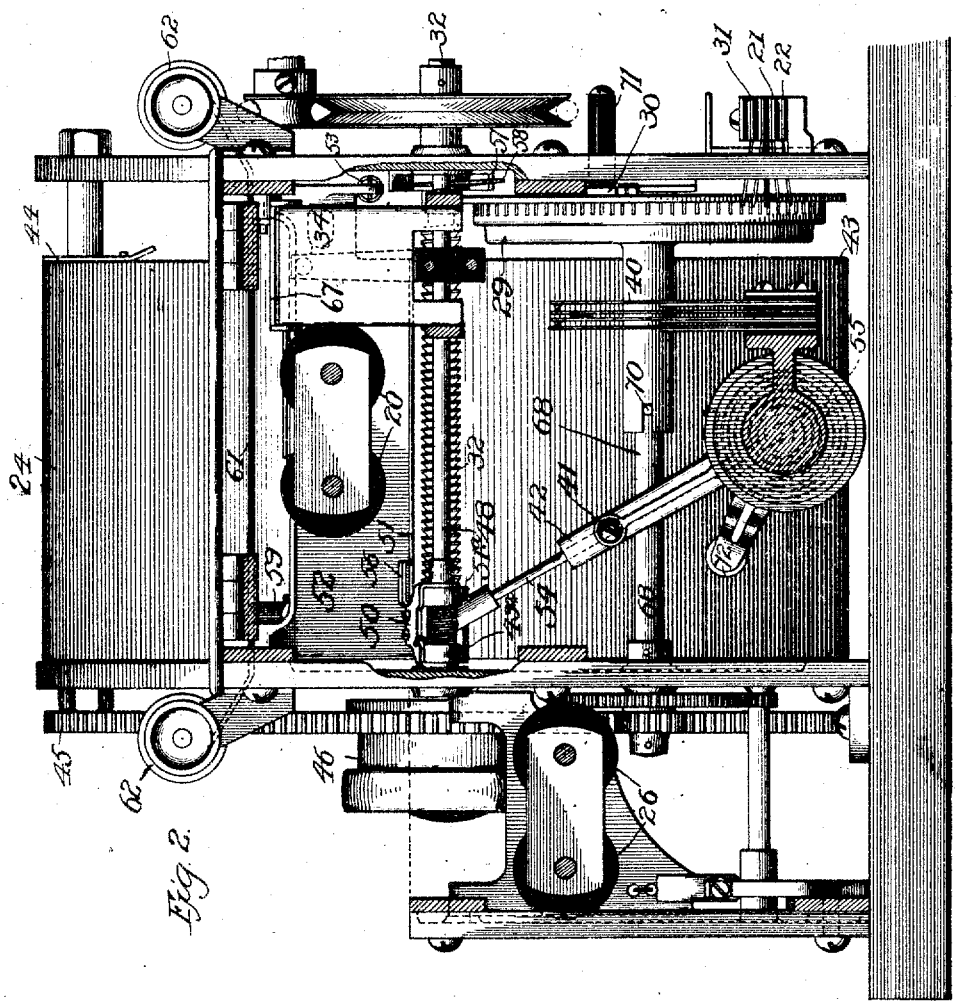
Witnesses:
Inventor:
Howard B. Holmes,
By Barton Vanum
Attys

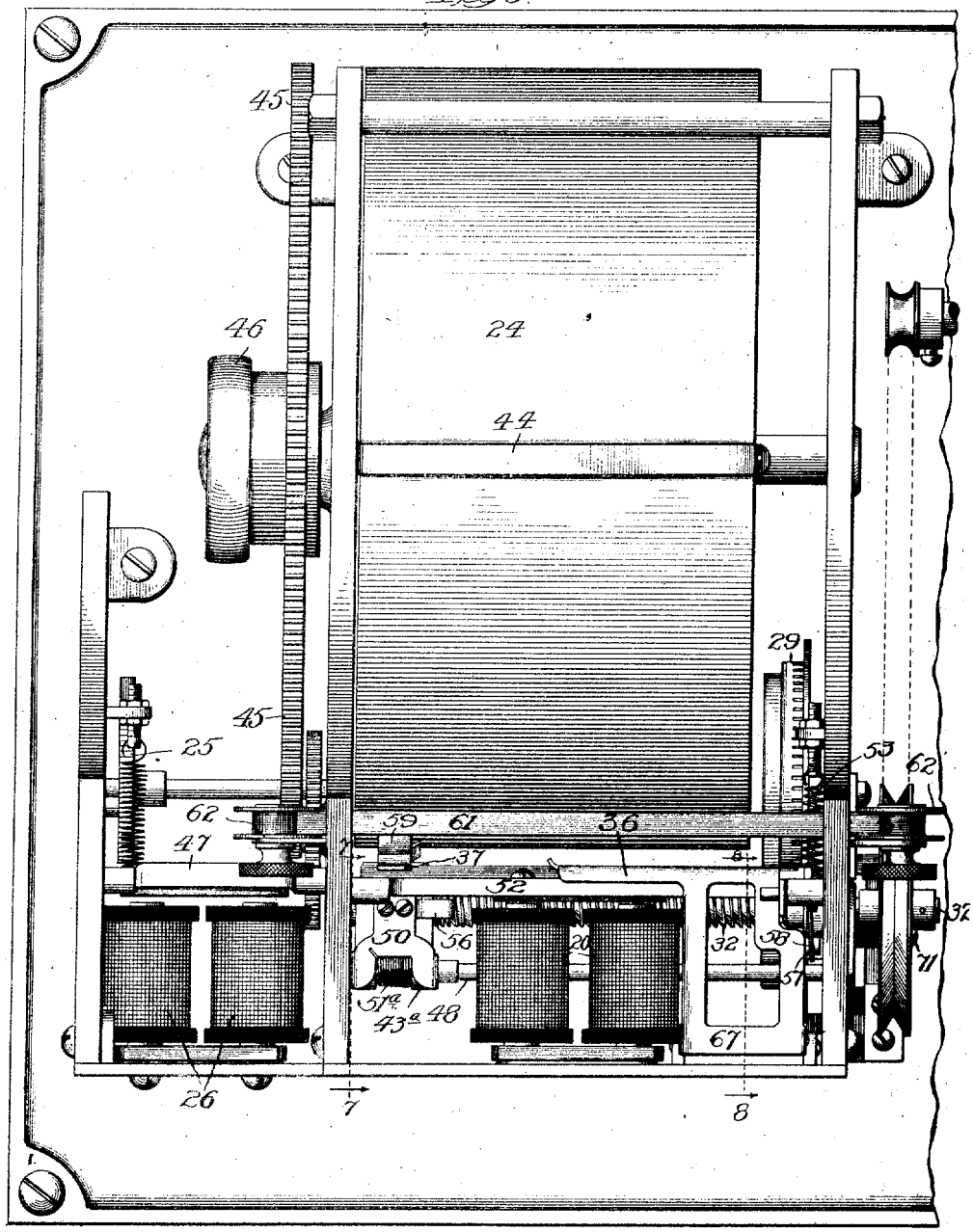

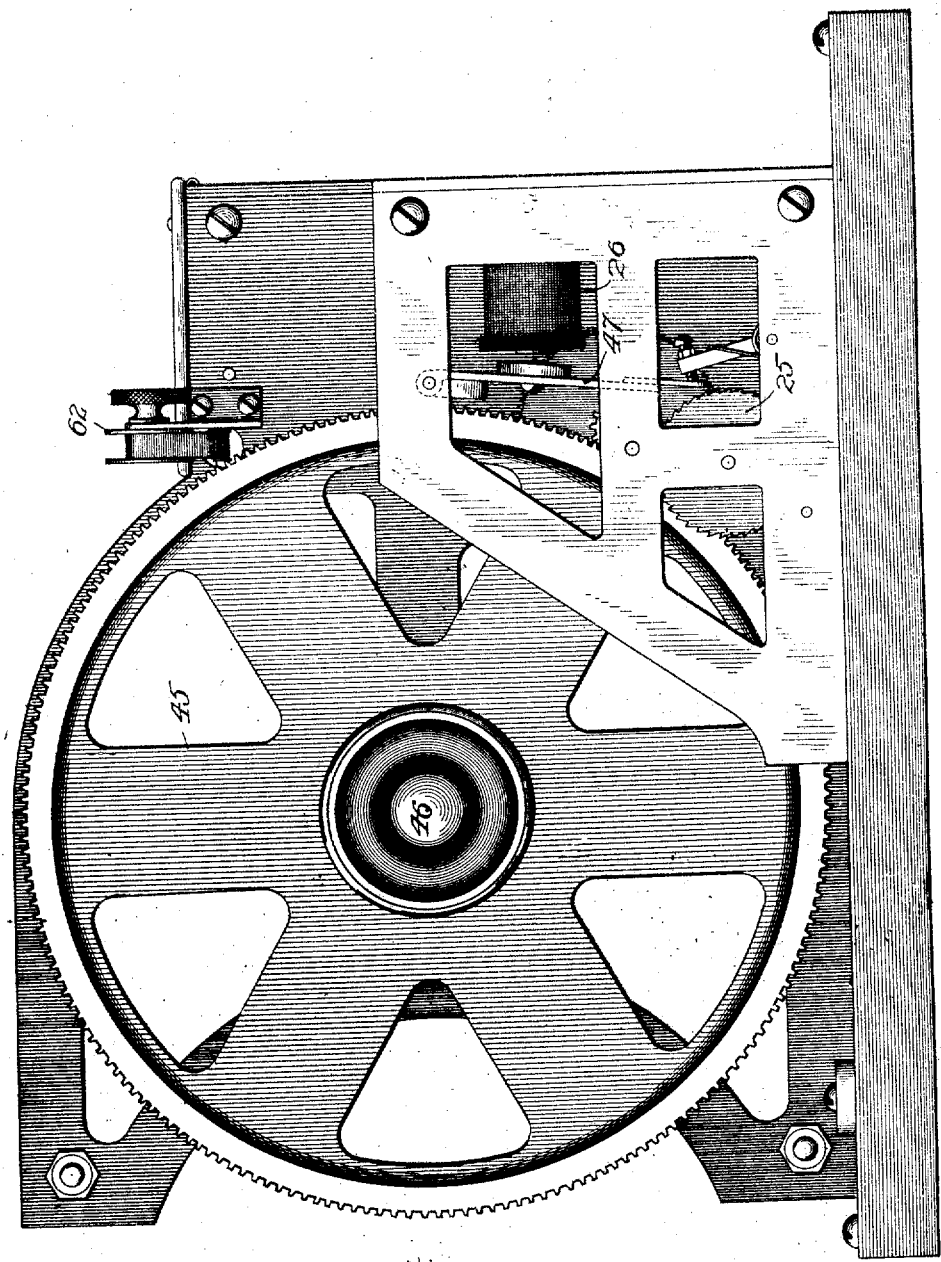

No. 862,478. PATENTED AUG. 6, 1907.
H. B. HOLMES.
WATCH SERVICE RECORDER.
APPLICATION FILED OCT. 20, 1905.
9 SHEETS—SHEET 5.
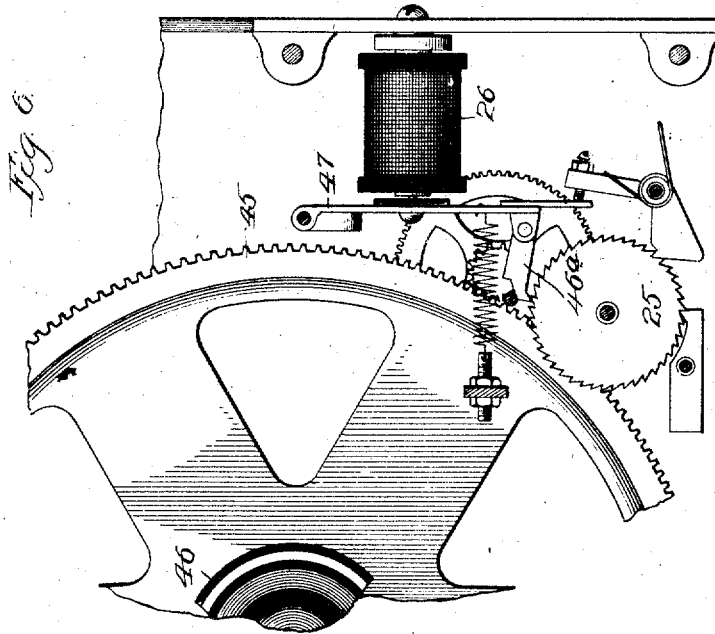
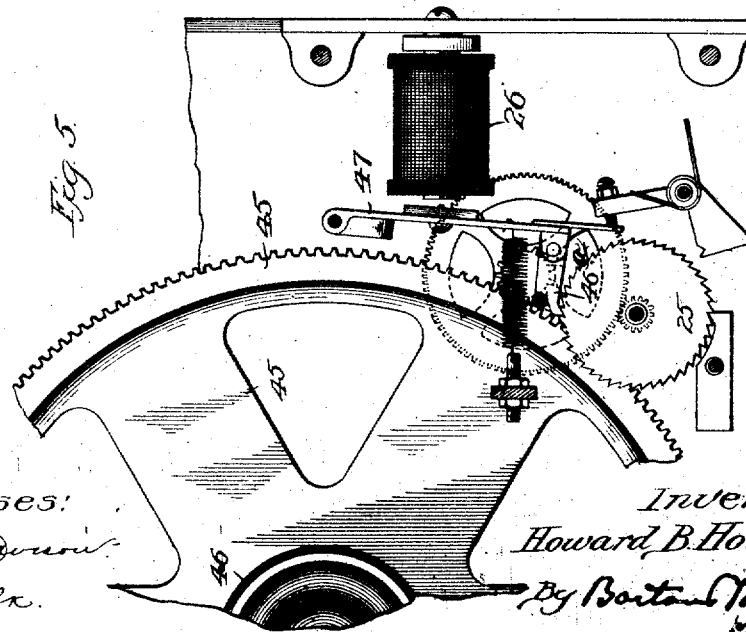
Witnesses:
Inventor:
Howard B. Holmes,
By Barton Norris
Attys No. 862,478. PATENTED AUG. 6, 1907.
H. B. HOLMES.
WATCH SERVICE RECORDER.
APPLICATION FILED OCT. 20, 1905.
9 SHEETS—SHEET 6.
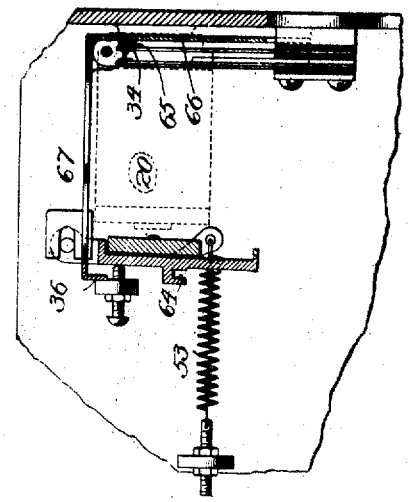
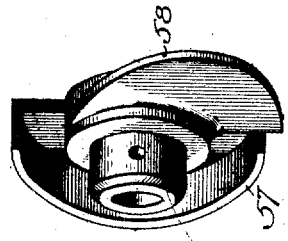
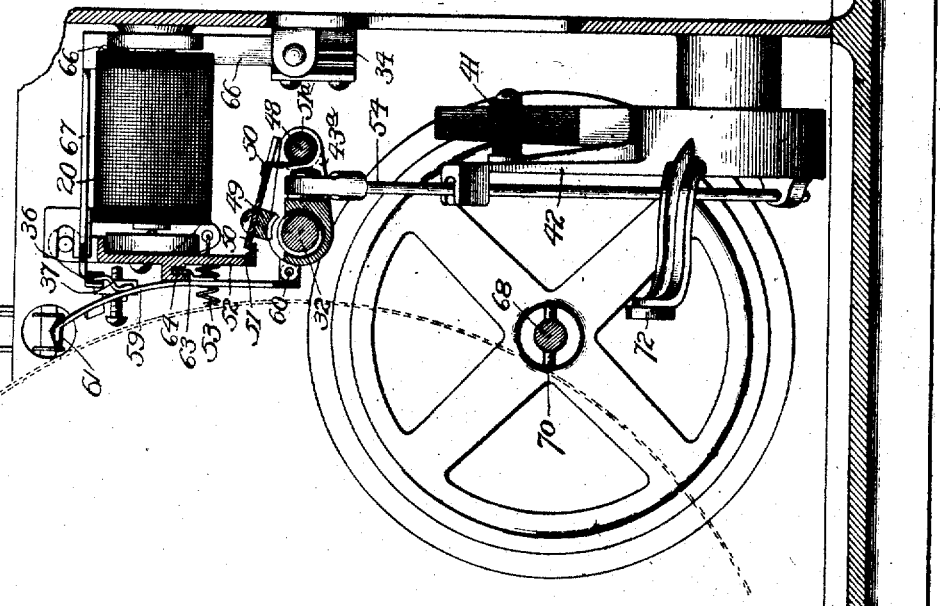
Witnesses:
Inventor:
Howard B. Holmes,
By Bastard Younan
Attys.

No. 862,478. PATENTED AUG. 6, 1907.
H. B. HOLMES.
WATCH SERVICE RECORDER.
APPLICATION FILED OCT. 20, 1905.
9 SHEETS—SHEET 7.
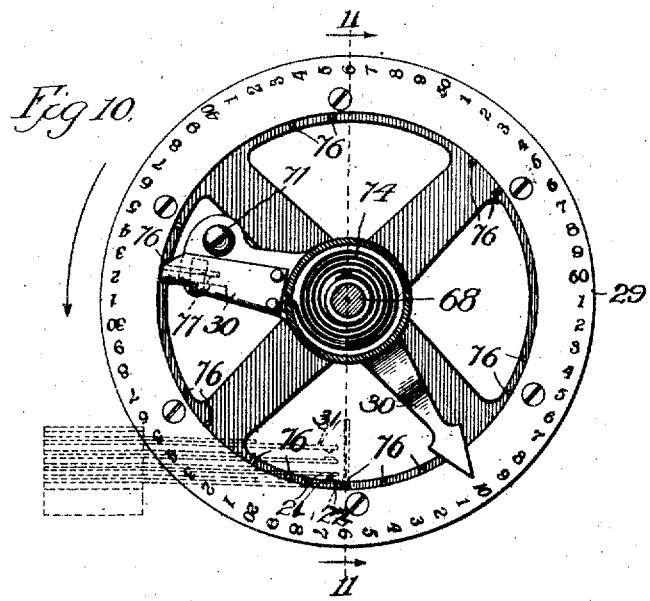
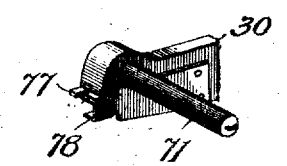
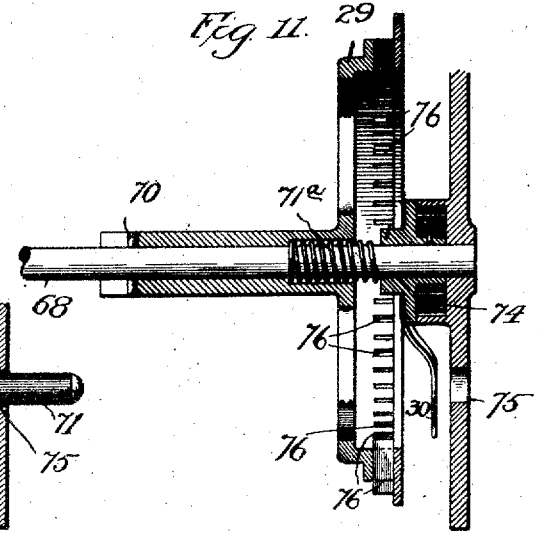
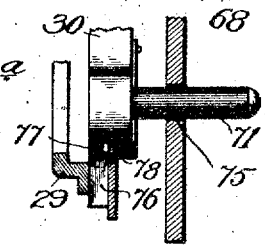
Witnesses:
Inventor.
Howard B. Holmes, No. 862,478. PATENTED AUG. 6, 1907.
H. B. HOLMES.
WATCH SERVICE RECORDER.
APPLICATION FILED OCT. 20, 1905.

9 SHEETS—SHEET 8.

Witnesses:

Inventor,
Howard B. Holmes,
By Barton & Brown
Attys.

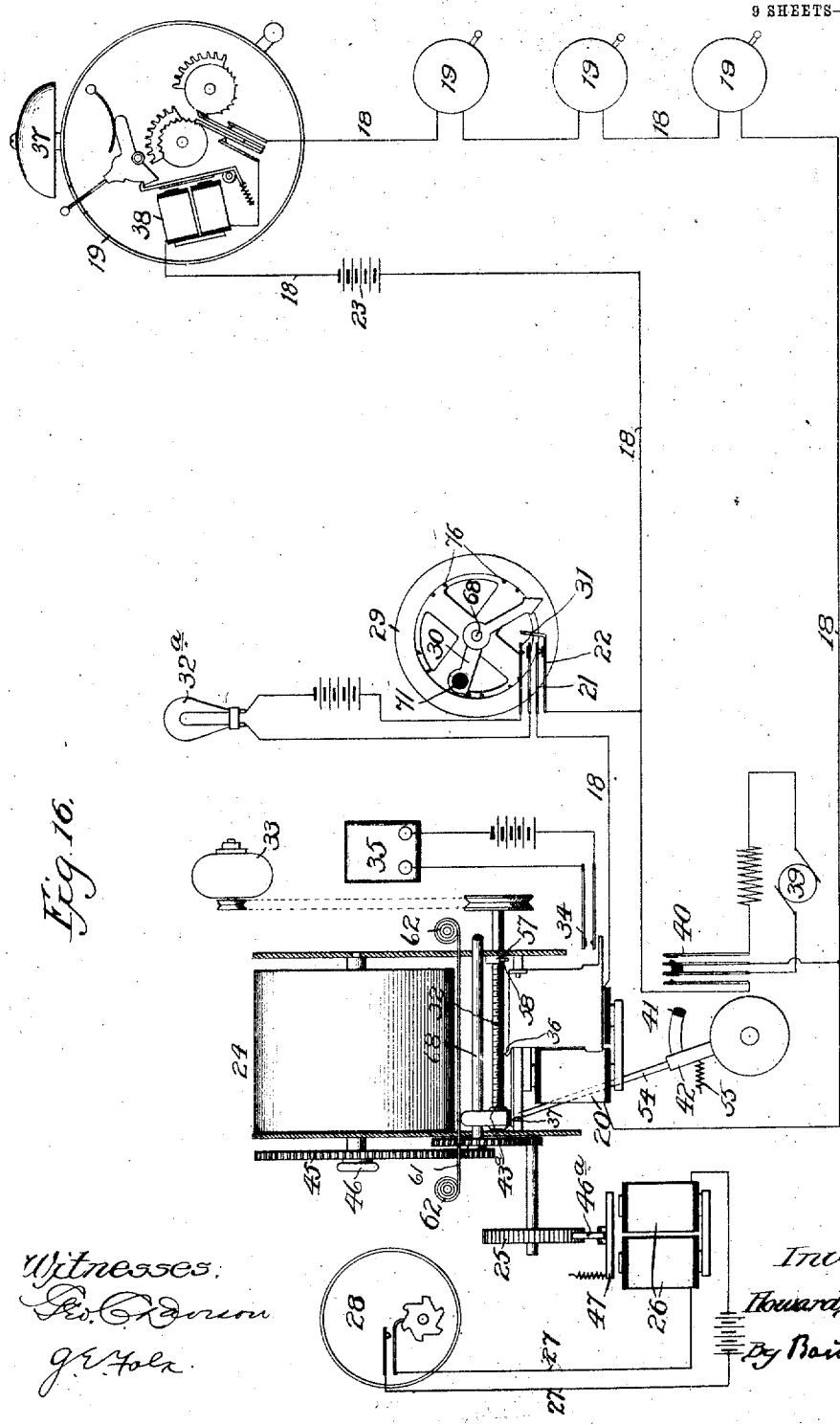

UNITED STATES PATENT OFFICE.

HOWARD B. HOLMES, OF PARK RIDGE, ILLINOIS, ASSIGNOR TO WESTERN ELECTRIC COMPANY, OF CHICAGO, ILLINOIS, A CORPORATION OF ILLINOIS.

WATCH-SERVICE RECORDER.

No. 862,478.     Specification of Letters Patent.     Patented Aug. 6, 1907.

Application filed October 20, 1905. Serial No. 283,625.

*To all whom it may concern:*

Be it known that I, HOWARD B. HOLMES, a citizen of the United States, residing at Park Ridge, in the county of Cook and State of Illinois, have invented a certain new and useful Improvement in Watch-Service Recorders, of which the following is a full, clear, concise, and exact description.

My invention relates to apparatus for recording the progress of a watchman as he travels over his beat and to record any delays or irregularities.

It has been customary heretofore to provide telegraph call boxes located at various stations along the beat which the watchman is expected to travel, with a telegraph register at a central office connected with the several call boxes and adapted to make a record of the signal sent from each box. This signal usually is merely the number of the particular call box which is operated; but special signals, such as fire alarms or the like, may also be transmitted. Such a system requires the supervision of an operator at the central office to note the time the signals are sent in from the different call boxes and in case of any unusual delay in receiving any signal it is usual to send out a special inspector to find out what the trouble is.

The present invention is designed to automatically make a record of each signal as it is sent in from any call box on the circuit, this record showing the exact time the signal is transmitted as well as the number of the call box from which it is transmitted and any special signal which may have been sent. But more particularly this invention contemplates means whereby in case of unusual delay of the watchman in sending in the signal a positive alarm is automatically given and a positive record made of the delay.

My invention will be described more particularly in connection with the accompanying drawings and the features or combinations which I regard as novel will be pointed out in the claims.

Figures 14, 15:
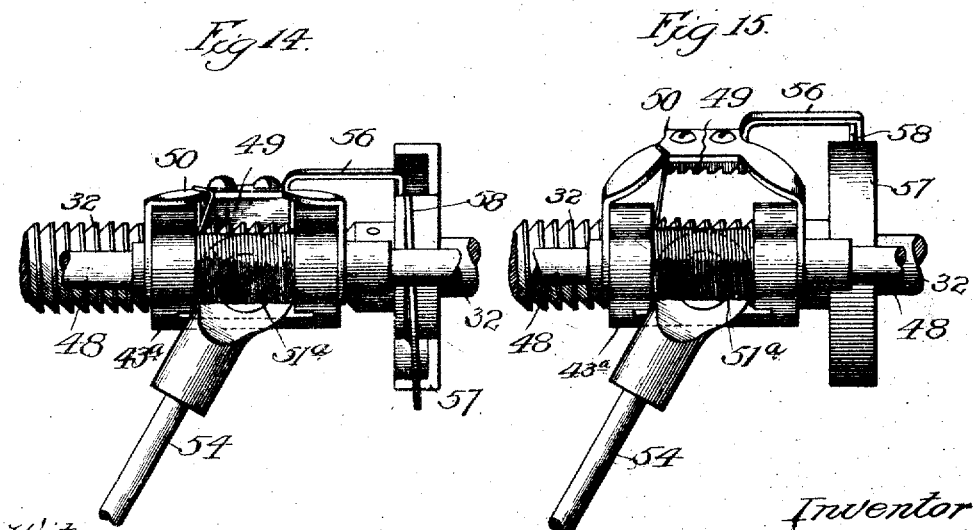

In the drawings—Figure 1 is a side elevation of the watch service recorder constructed in accordance with my invention. Fig. 2 is a front view thereof, the casing being removed to disclose the operating parts. Fig. 3 is a plan view also with the casing removed. Fig. 4 is an elevation looking at the opposite side from that shown in Fig. 1. Fig. 5 is a detail view showing the mechanism by which the record drum is advanced step by step, this advance taking place regularly under the control of suitable clock mechanism. Fig. 6 is a view similar to Fig. 5, but showing the parts in an alternative position. Fig. 7 is a detail sectional elevation of the recording mechanism, the parts being illustrated in their normal position. Fig. 8 illustrates some of the parts shown in Fig. 7 in an alternative position. Fig. 9 is a detail perspective view of a cam forming part of the mechanism hereafter to be described. Fig. 10 is a detail side view of an escapement wheel forming part of the mechanism which is brought into operation in case of any delay in the sending in of a signal. Fig. 11 is a sectional view illustrating said escapement wheel and its associated parts. Fig. 11$^a$ shows in detail a portion of the escapement mechanism. Fig. 12 is a detail perspective view of an arm which coöperates with the escapement wheel. Fig. 13 is a detail sectional view of the record drum and a portion of the mechanism for rotating the same. Fig. 14 is a detail front view of the traveler which carries the marking device. Fig. 15 is a similar view thereof showing an alternative position. Fig. 16 is a diagram showing the watch service recorder in association with the various electrical circuits which it controls and by which its operation is brought about.

The same letters of reference are used to designate the same parts wherever they are shown.

Before describing the mechanism of the particular recorder shown in the drawings, it will be well to give a brief outline of the general features of the system so that the scheme of operation may be understood, after which the particular mechanism will be explained in detail.

Referring first to the diagram, Fig. 16, the circuit 18 extends through a number of telegraph call boxes 19 of the well known type to the central office where it passes through the magnet 20 of the register, the circuit also including the normally closed contacts 21, 22 which are controlled by the time operated mechanism which takes account of delays, this mechanism being set to operate at the end of a given period, but being reset by the sending in of a signal, so that if the signals are sent in at their proper times the contacts 21, 22 controlled by the time operated mechanism will not be actuated. A source of current 23 is included in the circuit 18, and this circuit is normally closed at the various telegraph register boxes 19 so that the magnet 20 of the register at the central office is normally excited. When any one of the signal boxes 19 is operated by pulling down the handle thereof in the usual manner, the circuit is opened and closed a definite number of times to tick off the number of the box in question and also any special signal which may be sent. A marking device is operated by the armature of the magnet 20 to make a record of the transmitted number upon a record blank 24, which is preferably a sheet of paper mounted upon a drum 43 which is slowly rotated by clock controlled mechanism. In Fig. 16 a train of gear wheels is shown for rotating the record drum, said train being advanced step by step by means of a ratchet wheel 25 arranged to be advanced by a pawl actuated by an electromagnet 26; said magnet 26 is in a local circuit 27 which is closed at regular intervals by a clock 28, these intervals being timed so that a complete revolution of the drum 43 will be brought about within a given period—for example, twenty-four hours. The mechanism which advances the drum 43 also operates the escapement wheel 29 which is arranged to operate a contact operating arm 30; said arm is normally carried around with the escapement wheel 29, but upon the operation of the recorder in receiving a signal sent in from any of the boxes 19 the arm 30 is automatically set back, as will hereafter be described. If no signal is sent in within a given period of time, the arm 30 is carried around until it actuates contacts 31 which control a local circuit including an alarm signal 32ª, such as an incandescent lamp. The arm 30 is also adapted, unless released, to separate contacts 21, 22 so as to open the normally closed main circuit 18 which includes the magnet 20 of the recorder, thereby causing said magnet to actuate the recording mechanism.

The recording mechanism controlled by the magnet 20 may consist of a stylus which is adapted to be drawn across the face of the blank 24 by means of a worm shaft 32, and a carrier for the stylus engaging said worm shaft. An inked ribbon 61, such as a typewriter ribbon, is introduced between the end of the stylus and the face of the drum. The travel of the stylus will be produced by the worm shaft 32, the magnet 20 serving simply to control the pressure of said stylus against the drum. As the stylus reaches the end of its journey across the drum, the carrier mechanism is automatically reversed and returned to its normal position as will hereafter be described. The worm shaft 32 is kept constantly rotating by a motor 33, but the carrier bearing the stylus is kept normally out of engagement with the worm shaft, subject to control by the magnet 20. Upon the deënergization of said magnet 20 the threaded carrier bearing the stylus is brought into engagement with the rotating worm shaft 32 and moved across the record blank. Any movements of the armature of magnet 20 during the journey of the carrier serve only to move the stylus toward and from the record blank to print marks upon the latter.

The ordinary telegraph call box is arranged first to tick off its own number; after which any special number or signal is ticked off according to the setting of the index of the call box. In accordance with my invention the sending of any special signal after the number of the box has been transmitted will cause the sending of an alarm at the central office. This may be brought about by arranging the stylus or other part which is responsive to the movements of the magnet to operate a switch contact 34 which controls a local circuit including a buzzer or other alarm device 35. In the mechanism shown the contact 34 is arranged to be operated through the agency of a laterally movable rail 36 which extends along the latter half of the pathway of the stylus arm to be engaged by a projecting portion 37 thereof, so that as the stylus arm is moved to and fro by the magnet 20 in its response to the signal, the rail 36 will be moved laterally to operate the relay contact 34. The rail 36 preferably extends only along the latter portion of the pathway through which the stylus makes its journey so that the first movements of the stylus in recording merely the number of the call box will not cause the operation of the alarm 35.

In order that the watchman may know after he has operated his call box that the signal has been properly received and recorded at the central office, I provide an electromagnetic signal device at the call box which is adapted to be actuated by special current sent from the central office; and the recorder at the close of its operation after recording a signal sent in is arranged to actuate switch contacts which will apply to the circuit a source of special current adapted to actuate the signal at the call box. As shown in the drawing, the call box may be provided with a bell 37 and a spring actuated hammer for striking the same normally held under tension by a latch controlled by the armature of a magnet 38 which is included in the main circuit 18. The magnet 38 is adapted to respond only to special current from the generator 39 at the central office. Switch contacts 40 control the connection of said generator 39 with the main circuit, these contacts being arranged to be actuated by a pin 41 carried by a rocking arm 42 which is adapted to follow the movements of the carrier 43ª. At the end of each journey of the carrier therefore the pin 41 will be caused to actuate the contacts 40 and apply current from the generator 39 to the circuit, which current will actuate the magnet 38 of the substation call box and cause the bell 37 to be tapped, thus indicating that the call has been recorded.

It will be understood that the record blank 24 may have a scale printed thereon which may be divided off in divisions of time, as in hours and minutes. As the blank is rotated under the stylus by the operation of the clock mechanism, it will be seen that any mark made by the stylus upon the record blank will show by its relative position upon the scale the exact time at which the mark was made.

Coming now to a description of the particular mechanism of the recorder by which the various features of operation above described may be accomplished and referring to Figs. 3, 4, 5, 6 and 13, a sheet of paper constituting the record blank 24 is carried by a rotatable drum 43 and may be fastened to the surface of said drum by a spring clip 44 which passes across the surface of said drum in a furrow or channel therein, the paper being crimped in the channel and held tightly upon the cylinder underneath the clip 44.

A gear wheel 45 which is adapted to be driven through the agency of clock mechanism, as will hereafter be described, is mounted upon an axis concentric with the drum 43, and said drum and gear wheel may be independently rotated or they may be coupled to rotate together by means of a screw clamp 46. In adjusting the paper upon the drum, the drum may be revolved freely, and when the operation of the recorder is to be started, the record blank having been brought into the desired relation to the stylus or marker, the clamp 46 will be tightened and the drum will thereafter be rotatable only by the clock-driven gear wheel 45. The gear wheel 45 meshes with a train of other gear wheels ending in a ratchet wheel 25 which is adapted to be advanced step by step by means of a pawl 46ª carried by the armature lever 47 of the magnet 26. As previously explained, the magnet 26 is included in the local circuit 27 which is adapted to be intermittently closed and broken at regular intervals by switch contact mechanism operated by a clock 28. As the armature lever 47 is thus vibrated from the position shown in Fig. 5 to the position shown in Fig. 6, the ratchet wheel 25 is advanced step by step, and, acting through the train of intermediate gear wheels, slowly advances the gear wheel 45 which carries the record drum 43.

The mechanism for marking the record may be understood by reference to Figs. 2, 3, 7 and 8 together with the detail views Figs. 14 and 15 showing the movable stylus carrier. The worm shaft 32 extending across the register in front of the record drum is kept constantly in rotation by means of the motor 33 (Fig. 1).

A guide shaft 48 extends across the machine parallel to the worm shaft 32, and the stylus carrier 43ª is arranged to slide to and fro on said shafts 48 and 32. The movement of the carrier may be brought about by a threaded block 49 carried by a hinged arm 50 attached to said carrier, said block 49 being adapted to be engaged by the threads upon the worm shaft 32. A spring 51ª may be provided for holding the hinged arm 50 in position to force the threaded block 49 into engagement with said worm shaft. Normally, however, the arm 50 is held up as shown in Fig. 7 by a lip 51 which extends along the lower edge of the armature lever 52 of the magnet 20, said armature lever being normally held in its attracted position. When the magnet 20 is deënergized by the opening of the circuit 18 in which it is included, the armature lever 52 is retracted by a spring 53 and withdraws the lip 51 from under the arm 50 of the carrier, so that said arm is allowed to drop and carry the threaded block 49 of the carrier into engagement with the worm shaft 32. Said worm shaft being constantly rotated, the journey of the carrier across the register from left to right (Figs. 2 and 3) is therefore begun as soon as the armature lever 52 is retracted. Subsequent vibrations of the armature during the journey of the carrier have no effect upon the movement thereof as the end of the arm rides below the lip 51. The carrier thus continues its journey toward the end of the worm shaft 32, whereupon the arm 50 is automatically disengaged from the worm shaft and raised above the lip 51 by means of a cam 58 carried by said worm shaft, whereupon the carrier is returned to its normal position by a spring actuated pivoted arm 42. Said arm has a sliding extension 54, the end of which is pivoted to the carrier 43ª so that said arm follows the movement of the carrier. A coiled spring 55, shown in dotted lines in Fig. 2, tends to keep the arm 42 in the position shown in Fig. 2, and the movement of said carrier by the worm shaft 32 is made against the tension of said spring 55. To repeat, the purpose of the spring actuated arm 42 is to return the carrier to its normal position after the threaded block 49 has been raised from the worm shaft 32 at the end of the journey. The raising of the arm 50 carrying said threaded block is brought about by the cam 58 after the armature 52 has ceased its vibration and is again in the normally attracted position shown in Fig. 7, so that as the carrier is returned to its normal position the end of the pivoted arm 50 rides along the top of the lip 51 and so is held out of engagement with the worm shaft during the return journey. As the carrier reaches the end of its outward journey, the pin 41 carried thereby engages one of the springs of the switch contacts 40 to close said contacts and connect the generator 39 in the main circuit for the purpose of operating the signal 37 at the call box as heretofore explained.

The mechanism for raising the pivoted arm 50 to lift the block 49 from the worm shaft 32 at the end of the outward journey of the carrier is illustrated in detail in Figs. 14 and 15. It will be seen that the arm 50 carries a lateral extension 56 which is adapted to be engaged by the cam 58. After said arm 56 is thus raised, it is adapted to rest upon the outward surface of a shell 57 associated with said cam 58, said shell serving to hold up the arm 56 until the carrier has been moved to the left a sufficient distance so that the end of the arm 50 will be again supported by the lip 51 of the armature lever. Said lip 51 is of course cut away at the extreme end to allow the arm 50 to be raised, as shown in dotted lines in Fig. 2, and the shell 57 is for the purpose of holding the arm in its raised position until the carrier has moved back to a point where it will be supported by said lip.

Having described the operation of the carriage which bears the stylus across the record blank, I will now proceed to describe the mechanism by which the stylus may be caused to print the marks upon the record blank to correspond with the movements of the armature lever 52 of the magnet 20. The stylus arm 59 is pivoted at 60 to the carrier 43ª and the upper end of said stylus arm is arranged to glide between the folds of an inked ribbon 61 which is interposed between the end of the stylus and the face of the record drum. The ribbon may be carried upon rollers 62, 62 (Fig. 2) in a manner similar to that in which a typewriter ribbon is supported. The record drum rotates very slowly, and to prevent the ribbon from covering up the record which is made I preferably use a ribbon which is folded to present a comparatively sharp edge to the record drum, the end of the stylus being entered between the folds of the ribbon. To move the stylus arm 59 toward and from the record drum in response to the movements of the armature 52 of the electromagnet 20, I provide a projecting tongue 63 upon the stylus arm which is adapted to slide in a channel 64 formed in the rear of the armature lever 52. As the armature is vibrated the stylus arm will thus be caused to follow its movements. When the armature lever is retracted the stylus arm will be pushed toward the record drum to make a mark thereon, but when the armature is attracted as shown in Fig. 7 the stylus arm will be lifted out of contact with the drum. If the magnet remains deënergized during the entire journey of the stylus carrier across the record drum it will be seen that the stylus will merely mark a straight line across the record blank, but if during the journey the magnet 20 is intermittently excited to vibrate the armature lever 52 back and forth the result will be a broken line of a succession of marks which will correspond to the movements of the armature similar to the marks produced by an ordinary telegraph register. Thus, for example, if the call box is No. 144, the mechanism of the call box will be arranged to automatically transmit this number by first breaking the circuit once, then after a pause breaking the circuit four times, and again after another pause breaking the circuit four times. The result will be that at the first breaking of the circuit the armature lever 52 will be retracted, causing the stylus to be pushed against the record blank, while at the same time the pivoted arm 50 is released and causes the carrier 43 to begin its journey across the machine to carry the stylus across the front of the record blank.

As the carrier continues its journey, subsequent vibrations of the armature lever in response to the opening of the circuit by the call box four times and again four times, complete the registration of the number, which appears as a succession of dashes upon the record blank. After the number of the box has been thus transmitted any special signal made up of a combination of dashes, long or short, may also be recorded upon the record blank in the same manner. I have found it desirable, however, to provide a special alarm device to call the attention of the attendant to any such special signal. This alarm device in the apparatus shown consists of a buzzer 35 in the local circuit controlled by the contacts 34. The mechanism for operating these contacts is shown in Figs. 2, 3, 7 and 8. The contacts 34 are arranged to be operated by an insulating button 65 carried by a rocking lever or frame 66 which is adapted to move to and fro by a sliding frame 67 which has its edge turned over to form the rail 36 extending alongside the path of the moving stylus arm. The stylus arm is provided with a tongue 37 which is adapted to slide inside the rail 36 during the latter half of the journey of said stylus arm. If during the latter half of this journey, therefore the armature lever 52 of the magnet is retracted the tongue 37 carried by the stylus arm will engage the laterally movable rail 36 carried by the frame 67, thus moving said frame to rock the arm 66 and actuate the contacts 34. If the armature lever of the magnet remains attracted during the latter half of the journey of the stylus arm, the tongue 37 of said arm will simply slide upon the rail 36 without causing any movement of the latter and so without actuating the contacts 34 to sound the alarm signal.

I have thus far described the mechanism which is concerned with the ordinary operation of the recorder, assuming that the signals are sent in at the proper time by the watchman as he travels from box to box. I will now describe the mechanism which takes account of any unusual delay of the watchman in sending in a signal. One of the shafts 68 of the gear train which is advanced by the clock controlling mechanism carries an escapement wheel 29, shown in Figs. 10 and 11. This escapement wheel is therefore continually rotated at a rate bearing a definite ratio to the rate of rotation of the record drum, the escapement wheel thus making a complete revolution within a definite period of time, say one hour. A signal controlling arm 30 is arranged to be advanced by the escapement wheel in its rotation, said arm being set back with relation to the escapement wheel upon the operation of the register in receiving a signal. If signals are sent in therefore at predetermined intervals of time, the arm 30 will thus be progressively set back with relation to the escapement wheel so that it will not be advanced beyond a given point. If, however, the recorder is not operated within the predetermined period of time, the arm 30 is gradually advanced by the escapement wheel until it operates the mechanism which calls attention to the delay. This mechanism may consist, for example, of a signal lamp 32ª included in a local circuit under the control of normally open contacts 31, and the arm 30 may carry an insulating pin 71 which is adapted, as said arm is advanced beyond a predetermined point, to engage one of the contact springs 31 and close the contact, thereby causing the lamp 32ª to light and display its alarm signal. If desired, the alarm signal 32ª may be used only as a preliminary warning to the operator without causing any record to be made of the delay, and a second set of contacts 21, 22 may be arranged to be actuated upon a further advance of the arm 30 to control the recording mechanism. With this arrangement, if the watchman does not send in his signal at the end of the predetermined period of time, the lamp 32ª is lighted to warn the operator at the central office so that he may watch this recorder, whereupon after a further short delay if the watchman's signal is still not sent in, the contacts 21, 22 will be actuated to open the main circuit, which will cause the recorder to start in operation, drawing a straight line across the record blank. A positive record is thus made of any neglect of the watchman to turn in his signal within a predetermined time.

The means for setting back the arm 30 with relation to the escapement wheel 29 will be understood by reference to Figs. 7, 10 and 11 and 11ª. The escapement wheel 29, although mounted to rotate with the shaft 68, is slidable thereon. The sleeve forming the hub of said escapement wheel is slotted to receive the transverse pin or key 70 upon the shaft 68. As the shaft rotates the pin 70 causes the escapement wheel to rotate with it, but said wheel may be shifted longitudinally along the shaft, the slotted portion of the sleeve sliding with reference to the pin 70. The wheel 29 is normally maintained at the outer limit of its longitudinal movement along the shaft by means of a spring 71ª. The arm 42 which follows the movement of the stylus carrier 43 across the machine carries a foot 72 which is adapted toward the end of the journey to engage the end of the hub of the escapement wheel 29 and slide said wheel longitudinally for a short distance along the shaft 68, against the tension of the spring 71ª. The movement of the escapement wheel in this direction is limited by the throw of the foot 72. A spring 74 tends to set the arm 30 back with respect to the wheel 29, or, in other words, tends to maintain the arm 30 at the upper limit of its arc of movement, shown in Fig. 1, which is determined by a slot 75 in the framework of the machine, through which slot the pin 71 carried by the arm 30 projects. The escapement wheel 29 carries a number of teeth 76 projecting inwardly from the inner surface of the rim in position to normally engage a tooth 77 carried by the arm 30. The arm 30 also carries a tooth 78 which is adapted to be engaged by the teeth 76 of the wheel 29 when said wheel is in its alternative position, that is, when it is slid along the shaft 68 by the foot 72. Normally when the parts are in the positions shown in Figs. 10 and 11, the wheel 29 as it rotates in the direction indicated by the arrow will bring that one of its teeth 76 which lies nearest to the end of the arm 30 into engagement with the tooth 77 carried by said arm. As the escapement wheel continues to rotate the arm 30 will thus be carried around with it in the direction of the arrow until, if not sooner released, the pin 71 carried by said arm will be brought into engagement first with one of the springs 31 and later with the spring 22. When, however, the recorder is operated so that the carrier 43ª makes its journey, the foot 72 carried by the arm 42 will slide the escapement wheel 29 along the shaft so that the teeth 76 will be moved out of alinement with the tooth 77 carried by the arm and into alinement with the tooth 78 thereon. The arm is thus set back from the tooth 77 to the tooth 78 and as the escapement wheel is returned to its normal position after the journey of the carrier has been completed, the arm 30 is thus released and set back by the spring 74 to its normal position, or to a point where it is stopped by a succeeding one of the teeth 76 of the escapement wheel.

To recapitulate briefly, the arm 30 is arranged to be advanced by the time operated mechanism through the agency of the escapement wheel, and the escapement is actuated to set back the arm 30 by the operation of the recorder in receiving a signal. If desired, the escapement wheel may be marked off by a given number of divisions representing units of time as indicated in Fig. 10 where the wheel is shown divided into sixty divisions corresponding to the sixty minutes in an hour. The wheel 29 is then provided with a number of sockets, one corresponding to each division, in which sockets the teeth 76 may be removably mounted. The teeth may thus be set in any desired positions so that any desired time interval within which a record should be made, can be provided for.

In order to call the attention of the central office attendant to any delay of the watchman in sending in his signals, I provide means whereby after a predetermined delay the alarm signal associated with the recorder will be set in such a manner that it cannot be restored by any act of the watchman in sending in subsequent signals. As shown in the drawing, this locking means consists of a latch 30ᵃ which is pivoted upon the framework of the machine in such a position that the pin 71 in nearing the end of its arc of movement will ride beneath said latch and finally will advance far enough so that the hooked end of the latch will fall down behind the pin 71 and thus prevent the subsequent return of the arm 30 beyond the point determined by the hooked end of said latch. The pin 71 will thus be held within such limits of movement that it will at no time release the spring contact 31, so that the alarm signal 32ᵃ will be continuously displayed. A subsequent sending in of a call may serve to operate the register and also to cause the escapement wheel to release the arm 30, but said arm will nevertheless be held by the latch 30ᵃ until the attendant manually releases it.

I claim:

1. In a watch service system, the combination with a circuit extending from a call box or transmitter to a recorder, of a delay signal, time operated mechanism adapted to actuate said delay signal, means controlled by the operation of the recorder in recording a transmitted signal for blocking the operation of said delay signal, and means for causing said recorder to record a special signal when said delay signal operates.

2. The combination with a signal recorder, of an alarm signal associated therewith, time operated controlling mechanism for said alarm signal, an escapement for said time operated mechanism actuated in the response of the recorder, and means actuated by said controlling mechanism when operated to cause said recorder to record a special signal.

3. The combination with a recorder, of time controlled mechanism associated with the recorder and adapted to bring about the operation thereof, a signal circuit including a distant transmitter, means controlled by said transmitter for operating said recorder, and an escapement for said time controlled mechanism, said escapement being operated in the response of the recorder to a transmitted signal; whereby the recorder is influenced by the time controlled mechanism to record a delay in the transmission of a signal.

4. The combination with an electromagnetic recorder, of a circuit for operating the same, a call box or transmitter controlling said circuit, a special switch associated with the recorder also controlling said circuit, an actuating device 71 for said special switch, a time controlled moving part adapted to carry said actuating device into position to engage said switch, and means operated in the response of the recorder for setting back said actuating device relatively to said moving part.

5. In an automatic watch service system the combination with an electromagnetic signal recorder and a circuit for the same including a call box or transmitter controlling said circuit, of a switch associated with the recorder also controlling said recording mechanism, an operating arm for said switch, and a continuously moving time operated escapement wheel 29 having teeth adapted to carry said arm into engagement with said switch, and means actuated in the response of the recorder for setting back said operating arm relatively to said wheel.

6. A telegraph recorder comprising a marking device for a record blank and a magnet for actuating said marking device, in combination with a signal circuit including said magnet with transmitter mechanism for interrupting the circuit to produce corresponding actuations of said marking device, a switch associated with the recorder and controlling said circuit, time controlled mechanism for actuating said switch, and means operating in the response of the recorder in receiving a transmitted signal for setting back said time controlled mechanism; whereby signals sent by said transmitter mechanism are automatically recorded and a positive record is also made if the recorder is not operated within the period determined by said time controlled mechanism.

7. In a watch service system a recorder comprising a marker for a record blank and movable carrier mechanism adapted to move said marker across in front of the record blank, a magnet having an armature arranged to control the engagement of said marker with the record blank, whereby a succession of marks may be printed across the blank corresponding to the movements of the magnet armature, a signal circuit for said magnet including transmitter mechanism, a switch associated with the recorder and also adapted to control said circuit, time controlled mechanism for operating said switch, whereby a distinctive mark may be made upon the record blank, and means operated in the movement of said marker across the record blank for resetting said time controlled mechanism, whereby the record blank will bear a positive indication of delay in transmitting a signal.

8. In a recorder, the combination with a marking device adapted to record a signal upon a moving record blank, of a continuously rotating worm shaft, a carrier for said marking device having a threaded block adapted to engage said worm shaft to move said carrier, a magnet having an armature normally holding said block out of engagement with said shaft, and means controlled by the response of the magnet for bringing said marking device into engagement with said blank.

9. In a recorder, the combination with a continuously-movable worm shaft, of a carrier having a threaded block adapted to engage said shaft to move the carrier, a magnet, means controlled in the response of said magnet for bringing said threaded block into engagement with said shaft, and a marking device adapted to record a signal upon a time controlled moving record blank borne by said carrier and responsive to said magnet.

10. In a recorder the combination with a marking device arranged to be moved in front of a recording blank, of a controlling magnet, carrier mechanism for moving said marker along the record blank, said carrier mechanism being controlled in the response of said magnet, means controlled by succeeding responses of said magnet for engaging the moving marker with the record blank, and cam mechanism for reversing said carrier at the end of its journey.

11. In a watch service system the combination with a marking device adapted to record a signal upon a moving record blank, of a continuously rotating worm arranged to move said marking device, a magnet, an armature therefor normally maintaining said marking device out of operative relation to said worm, said armature being movably connected to said marking device to control its engagement with the record blank, a circuit for said magnet including transmitter mechanism for controlling said circuit, a cam adapted to disengage the marking device from said worm at the end of the journey, and spring actuated mechanism for returning said marking device to its normal position under the control of said armature.

12. In a recorder the combination with a continuously rotating worm shaft, a marking device for a record blank and a carrier therefor, having a portion adapted to engage said worm shaft to be moved thereby, a magnet, an armature therefor having a lip normally holding said carrier out of engagement with said worm and adapted upon the response of the magnet to release said carrier, a connection between said armature and the marking device, whereby said marking device responds to the vibrations of said armature during its travel, means for disengaging said carrier from the worm shaft at the end of the journey of said carrier, and means for returning said carrier to its normal position while held out of engagement with said worm by said lip.

13. In a recorder the combination with a marking device for a record blank, of a magnet, means controlled in the response of said magnet for moving said marking device along said blank, an armature for said magnet connected with said marking device to control the engagement thereof with said blank, an alarm signal, a controlling device therefor, and means controlled by the vibration of said marking device for actuating said alarm signal.

14. In a watch service system the combination with a recorder comprising a marking device for a record blank, means adapted to move said marking device along the record blank, a magnet controlling the engagement of said marking device with the record blank during its journey, a circuit for said magnet including transmitter mechanism for controlling said circuit, to operate said magnet, an alarm device and a controller 36 therefor adapted to be operated through the agency of said magnet during a definite portion of the journey of said marking device, whereby signals sent during said portion of the journey of said marking device will cause an alarm signal to be indicated.

15. In a recorder the combination with a marker for a record blank, mechanism adapted to carry said marker along the record blank, a magnet having an armature arranged to operate said marker during its journey, a laterally movable rail 36 disposed alongside a portion of the pathway of said marker, an alarm device controlled through the agency of said rail in the lateral movement thereof, and a portion carried by said marker adapted to engage said rail to cause the latter to follow the movements of said marking device; whereby signals received by the magnet during a portion of the journey of the marker will be indicated by said alarm signal.

16. In a watch service system, the combination with a circuit including a source of current extending from a transmitter to a recorder, of a movable recorder mechanism for said recorder, a magnet controlling the operation thereof included in said transmitter circuit, a source of special current at the central office, an electromagnetic signal at the transmitter unresponsive to said first mentioned source of current but responsive to said special current, and a switch actuated in the movement of said recorder mechanism for applying said special current to the transmitter circuit to operate said signal.

17. In a recorder the combination with a record blank, of a folded inked ribbon extending in front of said record blank and having its folded edge next to the surface thereof, a stylus having its end introduced between the folds of said ribbon, means for moving said stylus along in front of said record blank, the end of said stylus gliding between the folds of the ribbon, and means for vibrating said stylus to mark the record blank, substantially as set forth.

18. The combination with a movable arm 30, of a device adapted to be actuated by said arm when moved a given distance, a wheel, time controlled mechanism for rotating said wheel, teeth carried by said wheel adapted to engage with a portion carried by said arm to move said arm, means for moving said rotating wheel longitudinally to release said arm, and a spring for setting said arm backward with relation to said wheel.

19. The combination with a pivoted arm 30, of a device adapted to be actuated by said arm when moved to a given position, an escapement wheel 29 mounted concentrically with said arm, time controlled mechanism for continuously rotating said escapement wheel, said wheel having a number of sockets and escapement teeth removably carried in said sockets and adapted to engage a portion carried by said arm to move the same in the rotation of said wheel, said teeth being adapted to be adjusted at different points around the wheel to engage said arm at any desired intervals, means for causing relative longitudinal movement of said escapement wheel, to release said arm, and a spring for setting back said arm with relation to said wheel when released.

20. The combination with a pivoted arm, of a device adapted to be actuated by said arm when moved to a given position, a wheel adapted to move said arm, time controlled mechanism for rotating said wheel, and a set back escapement for said arm with reference to said wheel controlled by the relative longitudinal movement of said wheel.

21. The combination with an escapement wheel, of time controlled mechanism for rotating the same, teeth mounted around the periphery of said wheel, an arm 30 mounted concentrically with said wheel and having an escapement with said teeth operated by the relative longitudinal movement of said wheel and arm, a spring arranged to set back said arm with respect to said wheel in the operation of said escapement, and a device adapted to be actuated by said arm when advanced a given distance; whereby the actuation of said device by said arm may be prevented only by the operation of said escapement at definite intervals of time determined by the position of said teeth, substantially as set forth.

22. In a watch service system the combination with a signal circuit, of an electromagnetic signal recorder in operative relation to said circuit, a transmitter mechanism controlling said circuit to operate said recorder, a movable arm 30 associated with said recorder, and time controlled mechanism for advancing said arm, a set back escapement for said arm operated in the response of said recorder to a transmitted signal, a warning signal, a controlling device therefor operated by a given advance of said arm, and a record controlling device adapted to be operated by a further advance of said arm, substantially as described.

23. In a watch service recorder, the combination with a movable part and time-controlled mechanism for advancing the same, an alarm adapted to be operated through the agency of said movable part when advanced a given extent, signal recording mechanism, an escapement for said movable part, operated in the response of said recording mechanism and adapted to set back said movable part, and an automatic latch for said movable part adapted to limit the set-back movement thereof, said latch being brought into action by the advance of said movable part beyond a given point.

24. In a watch service system, the combination with a marker for a record blank, of mechanism adapted to carry said marker along the record blank, means for associating said marker with said mechanism, a magnet controlling the engagement of said marker with said blank during the movement of said marker, a circuit for said magnet including a transmitter, a signal at the transmitter, a source of special current at the central office for operating said signal, and a switch actuated in the movement of said marker for applying said special current to the transmitter circuit.

In witness whereof, I hereunto subscribe my name this 30th day of August A. D., 1905.

HOWARD P. HOLMES.

Witnesses:
ROY THOMAS ALLOWAY,
BERT STARR YORK.